United States Patent [19]

Guzowski

[11] Patent Number: 5,662,360
[45] Date of Patent: Sep. 2, 1997

[54] INTERLOCKED RESTRAINT FOR A PLASTIC PIPE JOINING SYSTEM

[75] Inventor: Samuel Guzowski, San Jose, Costa Rica

[73] Assignee: S&B Technical Products, Inc., Fort Worth, Tex.

[21] Appl. No.: 583,705

[22] Filed: Jan. 5, 1996

[51] Int. Cl.⁶ .................. F16L 55/00; F16L 47/00
[52] U.S. Cl. .................. 285/110; 285/921; 285/423; 285/260; 285/307
[58] Field of Search .................. 285/307, 921, 285/319, 423, 110, 111, 260

[56] References Cited

U.S. PATENT DOCUMENTS

| | | | |
|---|---|---|---|
| 3,217,400 | 11/1965 | Illesy et al. | 285/921 |
| 4,111,464 | 9/1978 | Asano et al. | 285/921 |
| 4,474,392 | 10/1984 | Vassallo et al. | 285/921 |
| 4,580,816 | 4/1986 | Campbell et al. | 285/921 |
| 4,779,902 | 10/1988 | Lee | 285/921 |
| 4,834,398 | 5/1989 | Guzowski et al. | 277/207 A |
| 4,991,882 | 2/1991 | Gähwiler | 285/921 |
| 5,015,014 | 5/1991 | Sweeney | 285/921 |
| 5,078,430 | 1/1992 | St. Onge | 285/921 |
| 5,213,339 | 5/1993 | Walworth | 277/1 |
| 5,267,757 | 12/1993 | Dal Palù | 285/921 |
| 5,380,049 | 1/1995 | Smowton | 285/921 |

FOREIGN PATENT DOCUMENTS

| | | | |
|---|---|---|---|
| 545598 | 6/1993 | European Pat. Off. | 285/921 |
| 4305609 | 11/1993 | Germany | 285/921 |
| 8903956 | 5/1989 | WIPO | 285/921 |

*Primary Examiner*—Eric K. Nicholson
*Attorney, Agent, or Firm*—Charles D. Gunter, Jr.

[57] ABSTRACT

An interlocking restraint plastic pipe joining system is shown which features female and male end connections for adjacent lengths of pipe. The female end connection has at least one radially extending indention or protrusion within the mouth opening thereof. The male end connection has at least one radially extending protrusion or indention formed on an exterior surface thereof. The indention and protrusion matingly engage in snap fit fashion as the joint is formed by forcing the male connection axially into the female connection.

15 Claims, 4 Drawing Sheets

INTERLOCKED RESTRAINT FOR A PLASTIC PIPE JOINING SYSTEM

BACKGROUND OF THE INVENTION

1. Field of the Invention

The present invention relates generally to plastic pipe systems of the type used for transporting fluids, potable water, sewage, electrical power lines, telephone and communication lines and, more specifically to such pipe systems which are assembled together to form an inseparable end connection in operating conditions.

2. Description of the Prior Art

Plastic pipe systems formed from polyolefins and other plastic materials are widely used for a variety of applications at the present time. With the advent of plastic pipe materials such as polyethylene, polypropylene and polyvinyl chloride, a need has existed for connecting lengths of pipe together to form a string of pipes. Such pipe strings typically range from one half inch or so in diameter to over five feet and can extend hundreds of feet in length.

Forming pipe joints for plastic pipe strings has previously been problematical, especially where access to equipment and labor have been difficult. For example, polyethylene pipe is commonly used to replace or repair city sewage and drain lines with lengths of pipe being interconnected by butt fusion welding processes. The ends of the pipe lengths to be joined are melted and, in their softened state connected to one another. Commonly, the pipe sections are of 20 foot lengths and are interconnected by using expensive, difficult to operate butt fusion welding equipment which requires skilled personnel on the job site, making the process laborious and expensive.

Other types of end connections which have been used in the past have utilized external clamps, sleeves or other auxiliary paraphernalia. Such devices are less than advantageous since they require extraneous parts and since the protruding clamp portions of the devices always present the danger of becoming accidentally struck and damaged or causing the connection to be stuck within a surrounding conduit. For example, in slip-lining of underground pipe, such as sewer pipe, external clamping devices would prevent the pulling or pushing of the pipe through a larger conduit to be repaired.

Other problems in the prior art systems include the tendency of the connected pipe sections to pull apart while in service, with consequent damage to the pipeline and environment, as well as difficulty in locating the break for repair. Plastic pipe systems which do not include interlocking ends present problems when turning sharp corners as well as in situations where tensile forces are exerted on the pipe string, such as in an earthquake.

In addition to using external saddles and clamp assemblies, certain of the prior art systems require a minimal length to the bell and spigot portions of the connection in order to provide some play within the joint without losing a seal. This solution sometimes resulted in wasting extra lengths of pipe material and providing less than satisfactory insurance that the joint seal would not be broken.

It is an object of the present invention to provide an interlocked restraint for a plastic pipe joining system which features pairs of female and male integral end connections which can be snap fitted together to form a secure locked end connection with adjacent lengths of pipe forming a pipe joint. The snap joints of the invention are a very simple, economical and rapid way of joining two different components. It is only necessary that a protruding part of one component be deflected briefly during the joining operation in order to catch in a depression in the mating component.

Another object of the invention is to provide an interlocked restraint for a plastic pipe joining system that will reduce the bell length required, therefore minimizing the amount of pipe material required.

Another object of the invention is to provide an interlocked restraint for a plastic pipe joining system that will avoid overinsertion during assembly of the joint.

Another object of the invention is to provide such a secure end connection which is formed by the snap fit of the male connecting end axially into the female connecting end, taking into account the deformability characteristics of the plastic pipe being utilized.

Another object of the invention is that after the joining operation, the joint should return to a stress-free condition.

Another object of the invention is to provide such a secure interlocked end connection for a joint of plastic pipe which does not rely upon the use of external clamps, sleeves, saddles or other auxiliary paraphernalia.

Anther object of the invention is to provide such a secure end connection for a plastic pipe system which securely prevents the connected ends from pulling apart in service to thereby prevent damage to the pipeline and environment.

SUMMARY OF THE INVENTION

The interlocking plastic pipe system of the invention includes a pair of female and male integral end connections for adjacent lengths of pipe. The end connections are adapted to be snap fitted together to form an interlocked end connection with adjacent lengths of pipe to form a pipe joint. The female end connection has at least one depression within a mouth opening thereof. The male end connection has at least one protrusion formed on an exterior surface thereof which is adapted to matingly engage, in snap fit fashion, the depression in the mouth opening of the female member. The joint is formed by the snap fit of the male connection axially into the female connection due to the deformability of the plastic pipe being utilized.

Preferably, in the event of sealed applications, the female end connection also has an annular groove adjacent the mouth opening thereof for receiving a sealing gasket having a sealing face generally. The sealing face of the sealing gasket provides the primary sealing surface for the pipe joint. In the case where the snap fit is located on the side of the gasket nearest to the mouth of the bell, female end connection, the protrusion will be located on the external surface of the spigot, male end connection and, the depression will be located within the mouth opening of the bell, female end connection. If the snap fit is located on the side of the gasket farthest from the mouth of the bell, female end connection, the protrusion will be located within the mouth of the bell, female end connection and, the depression will be located on the external surface of the spigot, male end connection to avoid interference. Also, if desired a plurality of mating depressions or protrusions can be provided within the mouth opening of the female end connections which engage mating protrusions or depressions provided in the exterior surface of the male connecting end.

Each depression or protrusion provided in the mouth opening in the female end connection can be formed as a circumferentially extending, radial groove or rib of generally uniform diameter. The protrusion or depression which is formed on the exterior surface of the male end connection can be a circumferentially extended radial rib or groove. The rib and the groove of the male and female end connection can be snap fitted together to distend the female end connection and compress the male end connection until a mating relation of the rib and groove is obtained. The circumferentially extended radial groove or rib can extend 360° about the circumference of the interior of the female end connection or can be broken up into one or more segments which extend about a portion of the circumference of the interior of female end connection. The circumferentially extended radial rib or groove provided on the male end connection can similarly extend 360° about the circumference of the exterior surface of the pipe, or can be broken up into one or more rib segments.

The deformability of the female member during axial insertion of the male member is preferably assisted by the presence of cooperative contact surfaces on the radially extended indentions and protrusions of the male and female end connections which assist one of said surfaces in riding over the other during insertion. Preferably, the circumferentially extended radial rib provided on the exterior surface of the male connecting end is wedge shaped with a front, sloping portion and rear shoulder portion. Contact between the rear shoulder portion of the male rib and the circumferentially extended radial groove in the female end connection provides an interlocking snap fit to resist axial forces and separation of the ends of the joint.

Additional objects features and advantages will be apparent in the written description which follows.

DETAILED DESCRIPTION OF THE INVENTION

Figure 1:
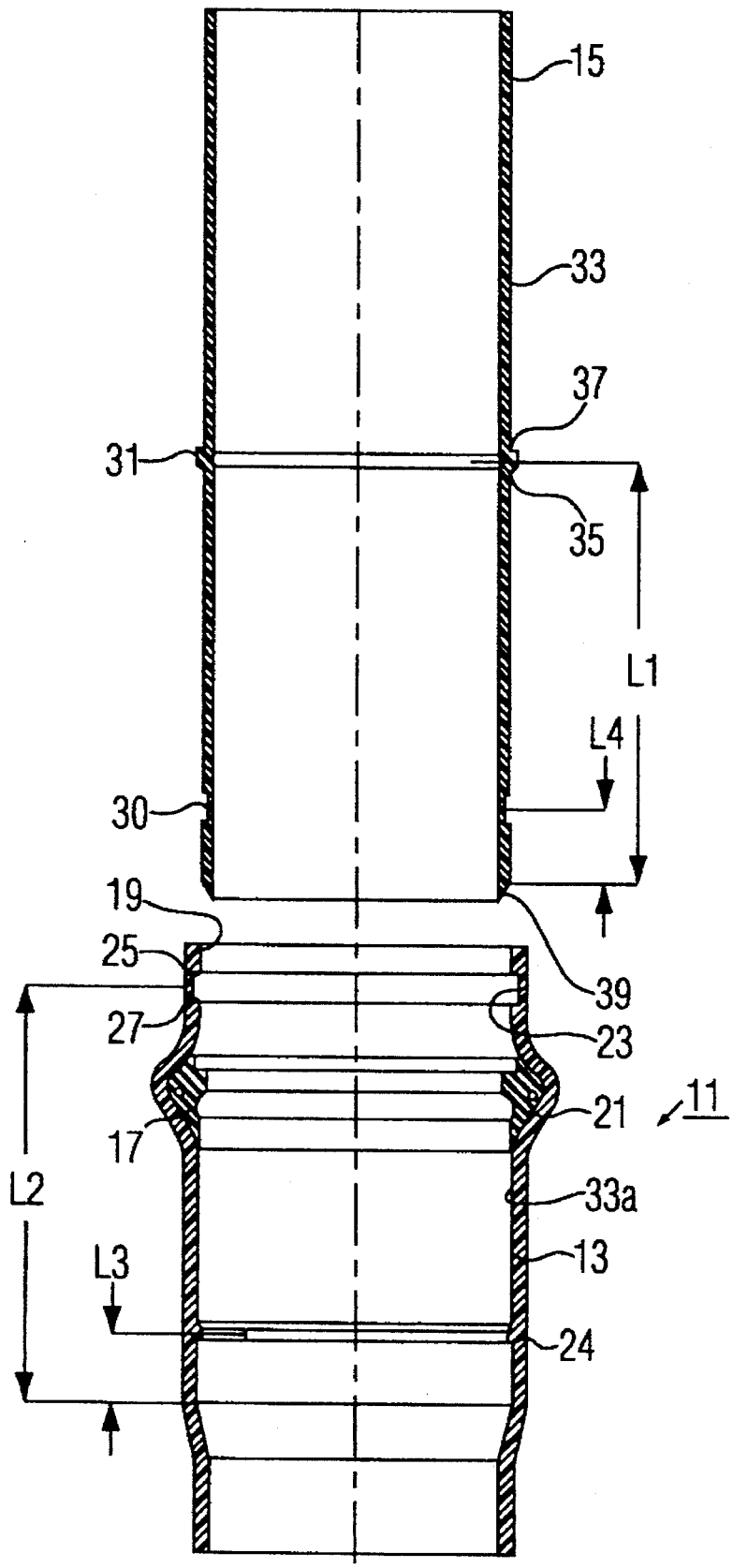
FIG. 1 is a view in axial section of the interlocking plastic pipe system of the invention showing the female and male integral end connections before being joined.

FIG. 1 shows an interlocking plastic pipe system of the invention designated generally as 11. The pipe system 11 includes a female integral end connection or bell 13 and a male end connection or spigot 15 for adjacent lengths of pipe, the connections being adapted to be snap fitted together to form an interlocked end connection with adjacent lengths of pipe to form a pipe joint.

The plastic pipe is preferably polyethylene but other polyolefin and plastic pipe materials, such as polypropylene and polybutylene, having similar characteristics of being semi-rigid, the ability to bend slightly along substantial lengths and having the capacity to distend or contract slightly may also be used. The pipes may range from one half inch in diameter to five feet or more in diameter and can be provided with a substantial wall thickness to withstand internal and external pressures and resistance to abrasion.

The integral female and male end connectors are preferably formed on the interior and exterior surface in the fabrication of the pipe itself, as in the molding process, or by machining. Each of the end connections has one or more ribs and grooves which interlock with one another when the female and male end connections are snap fitted together, as will be more fully described in the written description which follows.

As shown in FIG. 1, the female end connection 13 has an annular groove 17 adjacent a mouth opening 19 thereof for receiving a conventional sealing gasket 21. The annular groove 17 is preferably provided in the female end connection 13 during the pipe manufacture using techniques familiar to those skilled in the art.

The sealing gasket 21 can be of standard design and can assume any configuration capable of forming a sliding seal with the male end connection 15. The gasket could assume the configuration, for example, of the pipe gasket shown in U.S. Pat. No. 4,834,398, issued May 30, 1989, to Guzowski, and assigned to the assignee of the present invention.

Figure 6:
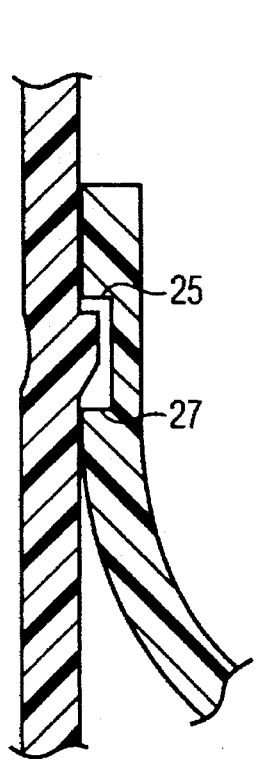
FIG. 6 is a partial, enlarged side sectional view of the female connecting end of the pipe joint of the invention showing a single circumferential indentation provided adjacent to the mouth opening thereof.
Figure 7:
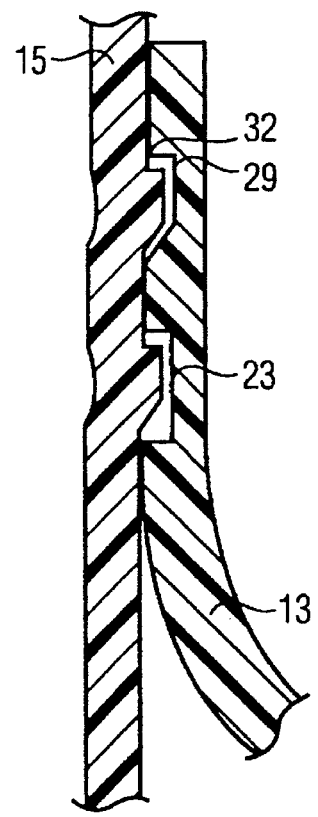
FIG. 7 is a view of another embodiment of the mouth opening of the female connecting end of the invention, similar to FIG. 6, showing a pair of circumferential indentations provided therein.

Unlike a standard "bell" end connection, the female end connection 13 also has at least one radially extending indention 23 within the mouth opening 19 thereof. In the embodiment shown in FIG. 1, the indention 23 is a groove located on the side of the gasket groove nearest to the mouth opening 19 thereof. The groove 23 is of generally uniform diameter and includes a radially extending forward shoulder 25 and rearward shoulder 27 (FIG. 6). As shown in FIG. 7, the female end connection 13 can also have additional indentions such as indention 29. The indention 29 includes a ramp shaped floor and a forward shoulder 32.

Figures 2, 2A:
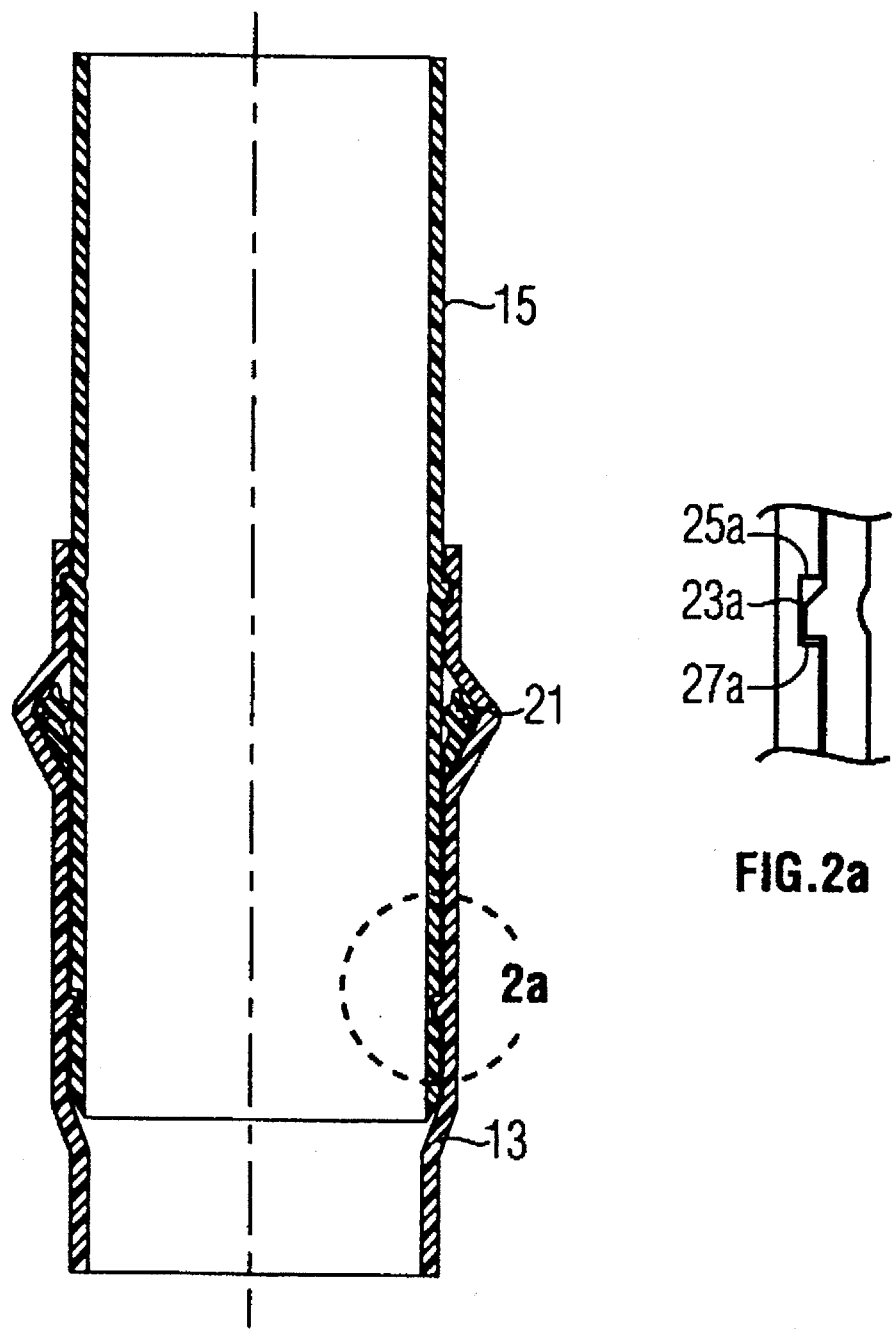
FIG. 2 is an axial section view, similar to FIG. 1, showing the joined ends of the pipe.
FIG. 2a is a close-up view of a portion of the joined ends of pipe showing a snap fit connection thereof.

The female end connection 13 can also be provided with a snap fit connection in which at least one radially extending protrusion 24 is provided on the interior surface 33a of the mouth opening thereof. In the embodiment shown in FIG. 1 and FIG. 2, the protrusion 24 is located on the side of the gasket groove farthest to the mouth opening 19 thereof. Protrusion 24 engages in snap fit fashion into groove 30 provided on the exterior surface 33 of the male end connection 15. The groove 30 is of generally uniform diameter and includes a radially extending forward shoulder 25a and rearward shoulder 27a (FIG. 2a).

As shown in FIG. 1, the male end connection 15 has at least one radially extending protrusion 31 and/or indention 30 formed on an exterior surface 33 thereof which is adapted to matingly engage, in snap fit fashion, the radially extending indention 23 or protrusion 24, respectively in the mouth opening 19 of the female end connection 13. The joint of pipe is formed by the snap fit of the male connection axially into the female connection due to the deformability of the plastic pipe material employed.

Preferably, the deformability of the female connecting end 13 during axial insertion of the male connecting end 15 is assisted by the presence of cooperative contact surfaces on the radially extending indentions and protrusions of the male and female end connections which assist one of said surfaces riding over the other during insertion. Thus, the circumferentially extending, radial rib 31 (FIG. 1) provided on the exterior surface 33 of the connecting end is wedge shaped with a front sloping portion 35 which is adapted to engage the forward shoulder 25 of the radial groove provided in the female end connection 13 to provide an interlocking fit to resist separation. Note that the length of the pipe (L1) between the protrusion 31 and the outer extent 39 of the male connecting end is sized to slide over the sealing gasket 21 during insertion, allowing the protruding rib 31 of the male member to be engaged within the mating groove 23 of the female member. The lengths L1 of the male connecting end and L2 of the female member (FIG. 1) can be made generally shorter than was required with the prior art connections without fear of losing the seal due to the interconnecting nature of the joint formed. FIG. 2 shows the assembled joint of the interlocking restraint for plastic pipe joining system of the invention.

Figure 3:
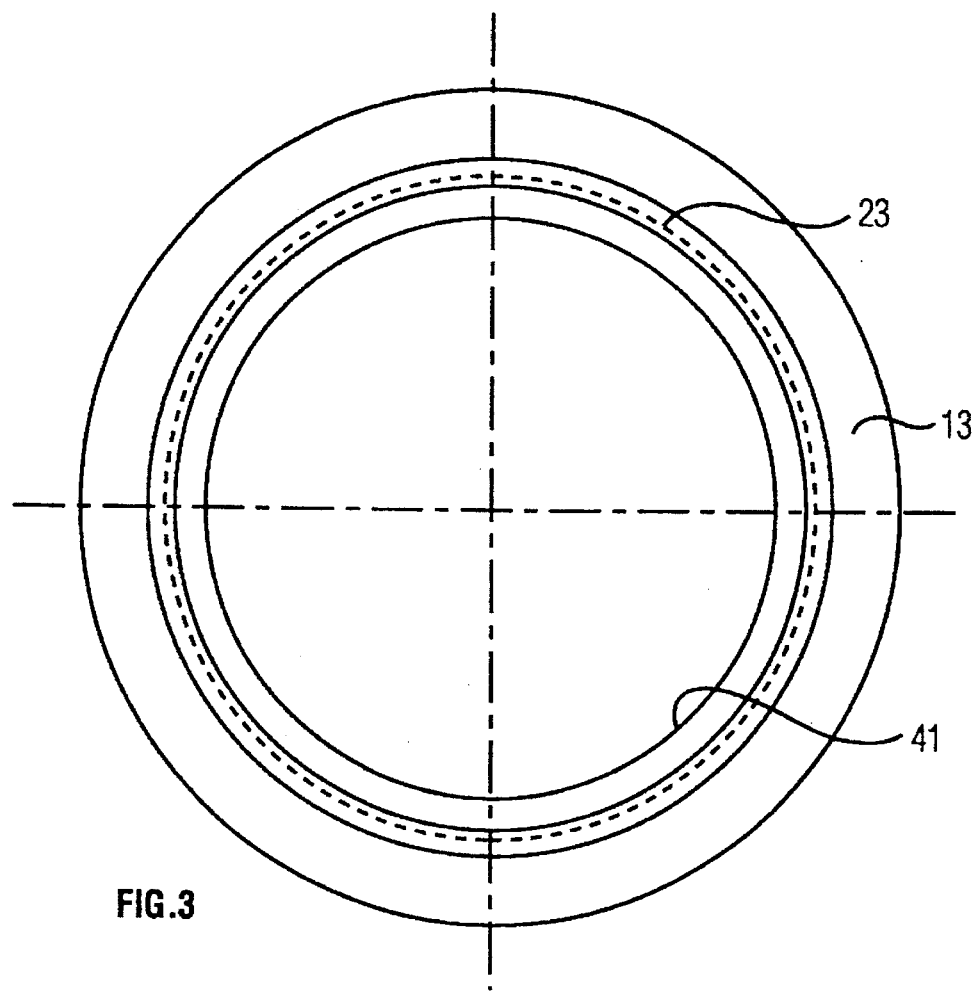
FIG. 3 is an end view of the female connecting end of the interlocking pipe system of FIG. 1 showing a 360° circumferential indentation therein.
Figure 4:
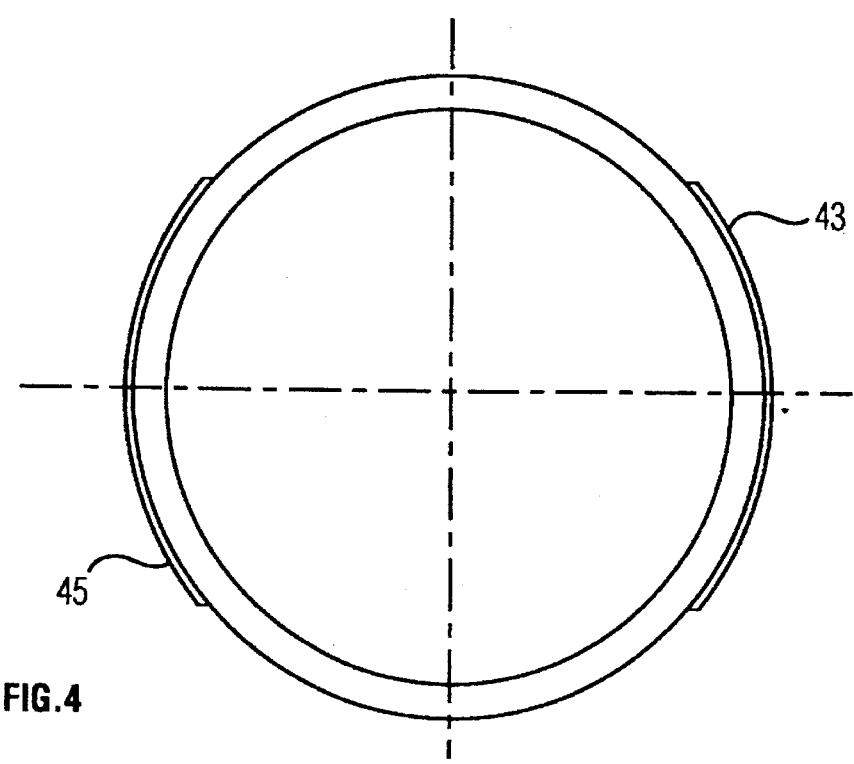
FIG. 4 is an end view of the male connecting end of the pipe joint of the invention showing two radially extending ribs spaced 180° apart about the circumference of the exterior thereof.
Figure 5:
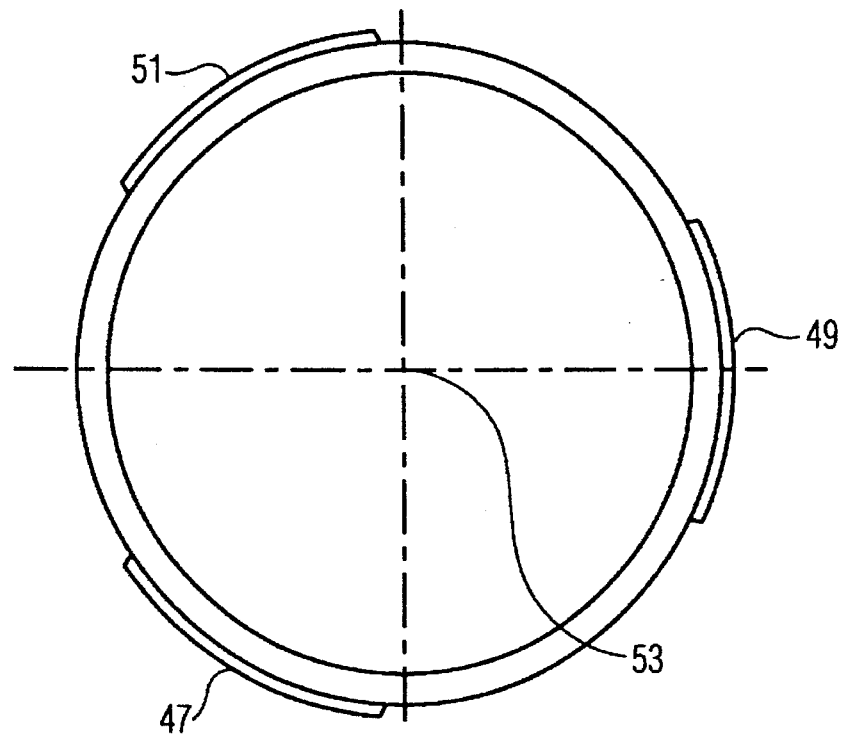
FIG. 5 is another embodiment of the male connecting end of the invention showing three radially extending ribs spaced apart 180° about the circumferential exterior of the male connecting end.

As shown in FIG. 3, the circumferentially extending, radial groove 23 can extend 360° about the circumference of the interior 41 of the female end connection 13. As will be apparent, the circumferentially extending, radial groove 23 can also be broken up into one or more segments which extend about a portion of circumference of the interior of the female end connection. Also the mating radially extending rib 31 formed on the exterior surface of the male end connection 15 can extend circumferentially 360° about the circumference of the exterior of the male end connection, as shown in FIG. 1, or can be broken up into two or more segments. Thus, as shown in FIGS. 4 and 5, the male connecting end can be provided, for example, with a pair of spaced apart ribs 43, 45, angularly spaced apart 180°, or as three ribs 47, 49, 51 which are spaced at 120° angular locations with respect to the center lines 53 of the male connecting end.

The protruding ribs 31 or 24, provided on the male and female end connections can be formed in any convenient manner, such as by heating a region of the pipe and forcing the length of the pipe against a tool or die to create a shoulder. The rib could also be machined on the pipe exterior or even be a separate component which is cemented or otherwise affixed to the pipe exterior or bell interior.

In use, the pipe of the invention with integral end connections can be simply and easily connected to form a stable and reliable interlocking joint. This is particularly advantageous in field applications where labor and equipment may be difficult to locate or be inaccessible. The joint is formed by the snap fit of the male or spigot connecting end axially into the female or bell connecting end due to the deformability of the plastic pipe to form a nonreleasable service joint including as the sole means for resisting tensile forces the opposed radial surfaces defined by the bell and spigot connecting ends which abut during the application of axial tensile forces to the joint. The pipe lengths may be joined in a string of pipe lengths and pulled or pushed to any desired final location. When joined, the interlocking fit provided by the ribs and mating grooves resist any tendency for separation between the joint connections. The wedge shape of the male rib and the forward shoulders of the female grooves further resist separation of the snap fitted joint and resist forces encountered in service after the pipe ends have been connected.

While the end connection has been described for both female and male end connections integrally formed in plastic pipe for use with each other, it will be understood that in some cases there may be a connection to a rigid steel pipe, or the like, equipped with mating rigs and grooves as at the terminal or beginning portion of a line of pipe.

The interconnecting plastic pipe system of the invention offers several advantages not found in the prior art. A snap fitted connection is provided for securely joining and interlocking adjacent sections of pipe. This allows, for example, plastic pipe to make a turn in direction in a sewer or other underground application without coming apart. It also offers security in those situations where external stresses act upon the pipe sections, such as an earthquake. The rib and groove interlocking connections allow ease of assembly of the joints and reduce the lengths of bell required in order to maintain the integrity of the sealing gasket. The absence of an external saddle or clamp insures that the pipe joints can be installed within surrounding conduits with a minimum of force and without becoming stuck.

While the invention has been shown in only one of its forms it is not thus limited but may susceptible to various changes and modifications without departing from the spirit thereof.

What is claimed is:

1. An interlocking restraint plastic pipe joining system for sealed applications, the system comprising:

a pair of female and male integral end connections for adjacent lengths of pipe adapted to be snap fitted together to form an interlocked end connection with adjacent lengths of pipe to form a pipe joint, said female end connections each having a mouth opening with a mouth opening diameter and having an annular groove adjacent the mouth opening thereof for receiving a sealing gasket, the annular groove having an internal diameter which at a maximum point is greater than the remaining mouth opening diameter, the annular groove also forming an exterior upset region in the female end connection, each of the female end connections having at least one surface selected from among a radially extending protrusion or indention within the mouth opening thereof, said male end connection having at least one surface selected from among a radially extending protrusion or indention formed on an exterior surface thereof which is adapted to matingly engage in snap fit fashion, the radially extending indention or protrusion in the mouth opening of the female end connection, said joint being formed by the snap fit of the male end connection axially into the female end connection due to the deformability of the plastic pipe; and a sealing gasket located within the annular groove provided within the mouth opening of the female end connection, said sealing gasket having a face surface which provides a primary sealing surface for said pipe joint.

2. The interlocking restraint plastic pipe joining system of claim 1, wherein the plastic is a material selected from the group consisting of polyethylene, polypropylene and polyvinyl chloride.

3. The interlocking restraint plastic pipe joining system of claim 1, wherein the deformability of the female end connection during axial insertion of the male end connection is assisted by the presence of cooperative contact surfaces on the radially extending indentions and protrusions of the male and female end connections which assist a selected surface of one end connection in riding over a selected surface of another end connection during insertion.

4. The interlocking restraint plastic pipe joining system of claim 1, wherein at least one radially extending indention formed within the mouth opening of the female end connection is located on the side of the gasket groove nearest the mouth opening thereof.

5. The interlocking restraint plastic pipe joining system of claim 1, wherein the female end connection is formed as a bell and the male end connection is formed as a spigot and wherein at least a first snap fit connection is located on the side of the sealing gasket farthest from the mouth of the female end connection and wherein at least a second snap fit connection is located on the side of the sealing gasket nearest the mouth of the female end connection, so that the snap fit connections span the sealing gasket when the pipe joint is assembled.

6. The interlocking restraint plastic pipe joining system of claim 1, wherein a plurality of mating radially extending indentions or protrusions are provided within the mouth opening of the female end connection which are adapted to engage mating radially extending protrusions or indentions provided on the exterior surfaces of the male connecting ends of the pipe sections.

7. The interlocking restraint plastic pipe joining system of claim 1, wherein the radially extending indention or protrusion provided in the mouth opening of the female end connection is a circumferentially extending radial groove or rib of generally uniform diameter and where in the radially extending protrusion or indention provided in the exterior surface of the male end connection is a circumferentially extending, radial rib or groove, said female and male end connections being adapted to be axially snap fitted together under stress to distend said female end connection and compress said male end connection until a mating relation of the ribs and grooves of the said end connections is obtained, after which the joint is allowed to return to a stress-free condition.

8. The interlocking restraint plastic pipe joining system of claim 7, wherein the circumferentially extending, radial groove or rib extends 360 degrees around the circumference of the interior of the female end connection.

9. The interlocking restraint plastic pipe joining system of claim 7, wherein circumferentially extending radial groove or rib is broken up into one or more segments which extend about a portion of the circumference of the interior of the female end connection.

10. The interlocking restraint plastic pipe joining system of claim 7, wherein said circumferentially extending radial rib or groove provided on the exterior surface of said male end connection, or the interior surface of the said female end connection, is wedge shaped with a front sloping portion and a rear shoulder portion, and wherein contact between the rear shoulder portion of the rib and the circumferentially extending, radial groove provide an interlocking fit to resist separation.

11. An interlocking restraint plastic pipe joining system comprising:

a pair of bell and spigot integral end connections for adjacent lengths of pipe adapted to be snap-fitted together to form an interlocked end connection with adjacent lengths of pipe to form a pipe joint, each of said bell end connections having a mouth opening with a mouth opening diameter and having an annular groove adjacent the mouth opening thereof for receiving a sealing gasket, the annular groove having an internal diameter which at a maximum point is greater than the remaining mouth opening diameter, the annular groove also forming an exterior upset region in the bell end connection, each of the bell end connections also having at least one surface selected from among a circumferentially extending radial groove or rib within the mouth opening thereof, said spigot end connection having at least one surface selected from among a circumferentially extending, radial rib or groove formed on an exterior surface thereof which is adapted to matingly engage, in snap fit fashion, the circumferentially extending, radial groove or rib in the mouth opening of the bell end connection, said joint being formed by the snap fit of the spigot end connection axially into the bell end connection due to the deformability of the plastic pipe to form a joint, including as the sole means for resisting tensile forces, the opposed radial ribs or grooves defined by said bell and spigot end connections which abut during the application of the axial tensile forces to the joint.

12. An interlocking restraint plastic pipe joining system of claim 11, wherein the spigot end connection is of generally uniform external diameter with the exception of the circumferentially extending, radial rib or groove and wherein the end of the spigot end connection between the radial rib or groove and the outermost extent thereof is selected to pass over the sealing gasket of the bell end connection when the spigot end connection is inserted within the bell end connection of the pipe joint.

13. An interlocking restraint plastic pipe joining system of claim 11, adapted to join a plastic pipe to a metallic element, including valves, fittings, tees, elbows and other accessories, to matingly engage in snap fit fashion the circumferentially extending radial groove in the mouth opening of the bell end connection.

14. An interlocking restraint plastic pipe joining system of claim 11, adapted to join plastic elements including valves, fittings, tees, elbows and other accessories, to metallic pipe and, to matingly engage in snap fit fashion the circumferentially extending radial rib formed or attached on an exterior surface of the spigot end connection.

15. An interlocking restraint plastic pipe joining system for sealed applications, the system comprising:

a pair of female and male integral end connections for adjacent lengths of pipe adapted to be snap fitted together to form an interlocked end connection with adjacent lengths of pipe to form a pipe joint, said female end connections each having a mouth opening with a mouth opening diameter and having an annular groove adjacent the mouth opening thereof for receiving a sealing gasket, the annular groove having an internal diameter which at a maximum point is greater than the remaining mouth opening diameter, each of the female end connections having at least one surface selected from among a radially extending protrusion or indention within the mouth opening thereof, said male end connection having at least one surface selected from among a radially extending protrusion or indention formed on an exterior surface thereof which is adapted to matingly engage in snap fit fashion, the radially extending indention or protrusion in the mouth opening of the female end connection, said joint being formed by the snap fit of the male end connection axially into the female end connection due to the deformability of the plastic pipe;

a sealing gasket located within the annular groove provided within the mouth opening of the female end connection, said sealing gasket having a face surface which provides a primary sealing surface for said pipe joint; and wherein at least one snap fit connection is located on opposite sides of the sealing gasket within the mouth of the female end connection when the pipe joint is assembled.

* * * * *